(12) United States Patent
Bermel et al.

(10) Patent No.: US 7,532,384 B2
(45) Date of Patent: May 12, 2009

(54) π-PHASE SHIFT DEVICE FOR LIGHT

(75) Inventors: Peter Bermel, Cambridge, MA (US); John D. Joannopoulos, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/560,129

(22) Filed: Nov. 15, 2006

(65) Prior Publication Data

US 2008/0112034 A1 May 15, 2008

(51) Int. Cl.
| | |
|---|---|
| G02F 1/01 | (2006.01) |
| G02F 1/07 | (2006.01) |
| G02B 1/10 | (2006.01) |
| G02B 5/28 | (2006.01) |
| G02B 6/00 | (2006.01) |
| G02B 6/02 | (2006.01) |

(52) U.S. Cl. .............. 359/279; 359/248; 359/260; 359/263; 359/586; 359/587; 359/588; 359/589; 385/122; 385/123; 385/125; 385/129; 385/131

(58) Field of Classification Search .......... 385/122, 385/123, 125, 129; 359/279, 248, 260, 263, 359/586–589
See application file for complete search history.

(56) References Cited

U.S. PATENT DOCUMENTS

| | | | |
|---|---|---|---|
| 5,355,104 A | | 10/1994 | Wolfson et al. |
| 5,852,688 A | | 12/1998 | Brinkman et al. |
| 5,882,773 A | * | 3/1999 | Chow et al. ............... 428/212 |
| 6,005,992 A | | 12/1999 | Augustsson et al. |
| 6,058,127 A | * | 5/2000 | Joannopoulos et al. ....... 372/92 |
| 6,538,794 B1 | * | 3/2003 | D'Aguanno et al. ....... 359/279 |
| 6,563,153 B2 | | 5/2003 | Wikborg et al. |
| 6,671,097 B2 | * | 12/2003 | Fink et al. ................ 359/586 |
| 6,819,691 B2 | * | 11/2004 | Fan ............................ 372/20 |
| 6,900,707 B2 | | 5/2005 | Erlig et al. |
| 6,957,003 B2 | * | 10/2005 | Lau et al. ................. 385/129 |
| 7,129,469 B2 | * | 10/2006 | Mochizuki et al. .......... 250/226 |
| 7,158,695 B2 | * | 1/2007 | Sugitatsu et al. ............ 385/14 |
| 7,194,174 B2 | * | 3/2007 | Dridi et al. ................ 385/129 |

(Continued)

FOREIGN PATENT DOCUMENTS

RU 2257648 7/2005

(Continued)

OTHER PUBLICATIONS

Lee, et al., "Demonstration of a Photonically Controlled RF Phase Shifter" IEEE Microwave and Guided Wave Letters, vol. 9, No. 9, Sep. 1999, pp. 357-359.

(Continued)

Primary Examiner—Brian Healy
Assistant Examiner—Hung Lam
(74) Attorney, Agent, or Firm—Gauthier & Connors LLP

(57) ABSTRACT

A phase shifter includes at least one photonic crystal structure having alternating high and low index dielectric layers. At least two defect structures are positioned between said photonic crystal structures. The defect structure includes one or more nonlinear materials used to produce an index change, whose effect is amplified to produce a specified phase shift in the output signal of said phase shifter.

24 Claims, 3 Drawing Sheets

U.S. PATENT DOCUMENTS

| | | | |
|---|---|---|---|
| 2003/0231397 A1* | 12/2003 | Shirane et al. | 359/586 |
| 2005/0047702 A1* | 3/2005 | Parker et al. | 385/1 |
| 2005/0179507 A1 | 8/2005 | Yoon | |
| 2005/0238310 A1* | 10/2005 | Hoshi et al. | 385/129 |
| 2005/0259999 A1 | 11/2005 | Covey | |
| 2006/0055920 A1 | 3/2006 | Wang et al. | |
| 2006/0066867 A1* | 3/2006 | Beausoleil | 356/481 |
| 2006/0251368 A1* | 11/2006 | Kittaka et al. | 385/125 |

FOREIGN PATENT DOCUMENTS

| | | |
|---|---|---|
| WO | 0010040 | 2/2000 |
| WO | 03062909 A2 | 7/2003 |
| WO | 03062909 A3 | 7/2003 |

OTHER PUBLICATIONS

Microwave Encyclopedia, "Phase Shifters" Microwaves.com, Updated Sep. 13, 2004, 5 pages.

* cited by examiner

π-PHASE SHIFT DEVICE FOR LIGHT

This invention was made with government support awarded by the National Science Foundation (NSF) under Grant No. DMR-0213282. The government has certain rights in the invention.

BACKGROUND OF THE INVENTION

The invention relates to the field of phase shifters, and in particular a phase shifter comprising an arrangement of photonic crystal microcavities, which each include a defect region containing nonlinear materials.

Phased arrays are playing an increasingly significant role in space-based and national defense applications. However, a practical implementation of arrays with thousands of elements is limited by the complexity of the antenna and feed structures as well as the active phase-shifting elements. The use of integrated photonics for the realization of phased array beam forming is of much interest due to benefits like low cost, low weight, and low power consumption. One of the key components of such an integrated approach is a photonic radio frequency (RF) phase shifter that can provide an accurate and easily controllable phase shift.

SUMMARY OF THE INVENTION

According to one aspect of the invention, there is provided a phase shifter. The phase shifter includes at least one photonic crystal structure having alternating high and low index dielectric layers. At least two defect structures are positioned between said photonic crystal structures. The defect structure includes one or more nonlinear materials used to produce an index change, whose effect is amplified to produce a specified phase shift in the output signal of said phase shifter.

According to another aspect of the invention, there is provided a method of forming a phase shifter. The method includes forming at least one photonic crystal structure having alternating high and low index dielectric layers. Also, the method includes positioning at least two defect structures between said photonic crystal structures. The defect structure includes one or more nonlinear materials used to produce an index change, whose effect is amplified to produce a specified phase shift in the output signal of said phase shifter.

DETAILED DESCRIPTION OF THE INVENTION

Consider the problem of changing the phase of a beam of light. The most direct approach is to modulate the index of the material through which it passes. The phase change for a plane wave with frequency $\omega$ passing through a material of thickness d with index modulation $\Delta n$ is $\Delta\phi=\Delta n\omega d/c$ (where c is the speed of light). Physically, index modulation is realized by applying an electric field to a nonlinear material. Effects causing this index modulation include the Pockels effect (first order in field strength) and the Kerr effect (second order in field strength). There are limits to how much of an index change can be induced by an applied voltage before electrical breakdown occurs.

When the level of index modulation of a particular material for a given thickness is found to be insufficient to achieve a desired phase shift directly, there are two alternative approaches that can be used. First, a different material can be chosen. However, typically there is a limit to the performance of all materials in a given frequency range due to physical reasons, and some of the materials with the best performance in terms of nonlinearity may also have drawbacks such as high absorption. Second, a structural approach can be employed. Introducing a structure which slows down light can enhance the phase change associated with a given thickness of nonlinear material. Physically, this can be pictured as light bouncing back and forth multiple times, picking up a fixed phase shift on each pass. As a result of this picture, the maximum phase shift enhancement is proportional to the number of bounces, and therefore the quality factor Q. More formally, one can write the phase $\phi$ associated with a collection of resonances with central frequencies $\omega_i$ and widths $\Gamma_i$ as:

$$\cot\phi = \sum_i \frac{2}{\Gamma_i}(\omega - \omega_i) \qquad \text{Eq. 1}$$

The linearity of the arccotangent function near resonance yields a phase derivative $d\phi/dn=2/\Gamma_i=2Q/\omega_i$, which proves the maximum enhancement is proportional to Q. Going completely across one resonance by integrating over all frequencies yields a π phase shift. Combining multiple resonances can allow for arbitrarily large phase shifts.

Figure 1:
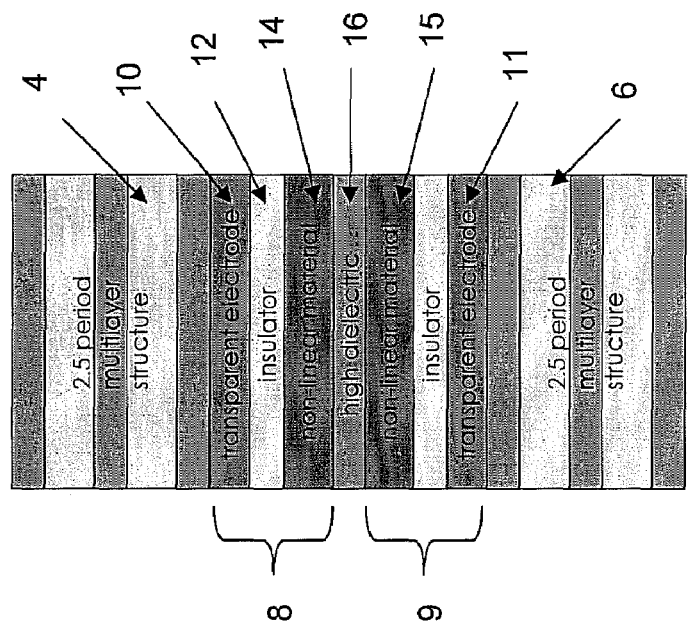
FIG. 1 is a schematic diagram of an exemplary 1-D photonic crystal in accordance with the invention.

An embodiment of the inventive phase shifter 2 includes three photonic crystals 4, 6, and 16, and two resonant cavities 8 and 9, as shown in FIG. 1. All of these photonic crystal regions 4, 6, and 16 can be 1D photonic crystals comprising of high and low dielectric indices; in this embodiment, region 16 is reduced to the minimum possible size of one layer of high dielectric material. Note that in other embodiments, the photonic crystal regions 4, 6, and 16 can comprise a high index photonic crystal slab in 2D or a photonic crystal having a complete photonic bandgap in 3D; furthermore, in higher dimensions, regions 4, 6, and 16 could be combined to enclose resonant cavities 8 and 9. The defect structure 8 is placed between the two photonic crystals 4 and 16, and comprises a multi-layered arrangement that includes a transparent electrode 10, an insulator layer 12, and a nonlinear layer 14. The defect structure 9 is placed between the two photonic crystals 16 and 6, and comprises a multi-layered arrangement the same as in defect structure 8 but reversed in order, so that the transparent electrodes 10 and 11 can simultaneously shift the index of both nonlinear layers 14 and 15 upon the application of an electric field.

This structure will give rise to low transmission within the bandgap except close to the two resonant frequencies. For two well-separated peaks, the adjacent peak phase difference will be given by π. One can then exploit this property by taking the following approach. First, choose the nonlinear material index and thickness such that the lower cavity resonant frequency coincides with the desired operating frequency. Then apply a voltage sufficient to shift the higher frequency peak down to the operating frequency.

Now, the phase of the output light signal will be $\pi$ out of phase with what was observed previously. The thickness of the device proposed in FIG. 1 is about 8.2a, where a is the period of a bilayer structure, when using high and low indices of $n_{hi}$=2.4 and $n_{low}$=1.6 for the microcavities, respectively. Converting to physical distances yields device thicknesses of 12.3 cm at 5 GHz, and 1.23 m at 500 MHz. The thicknesses could be reduced by at least 32% through the use of very high index contrast materials. Furthermore, note that the fractional bandwidth of the phase shifting effect will be inversely proportional to the quality factor of the cavity. Therefore, if a bandwidth of about 3% of the central frequency is required, this could be achieved using a relatively low quality factor $Q \leqq 33$.

Figure 2:
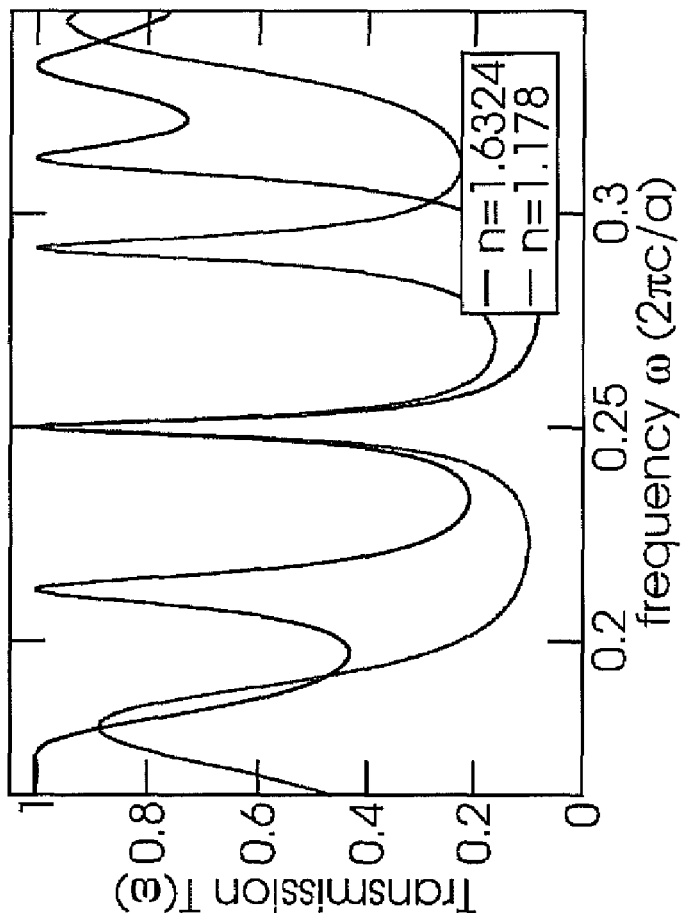
FIG. 2 is a graph demonstrating the transmission as a function of frequency for two values of the index of the nonlinear material in the microcavities, $n_c=1.178$ and $n_c=1.6324$.
Figure 3:
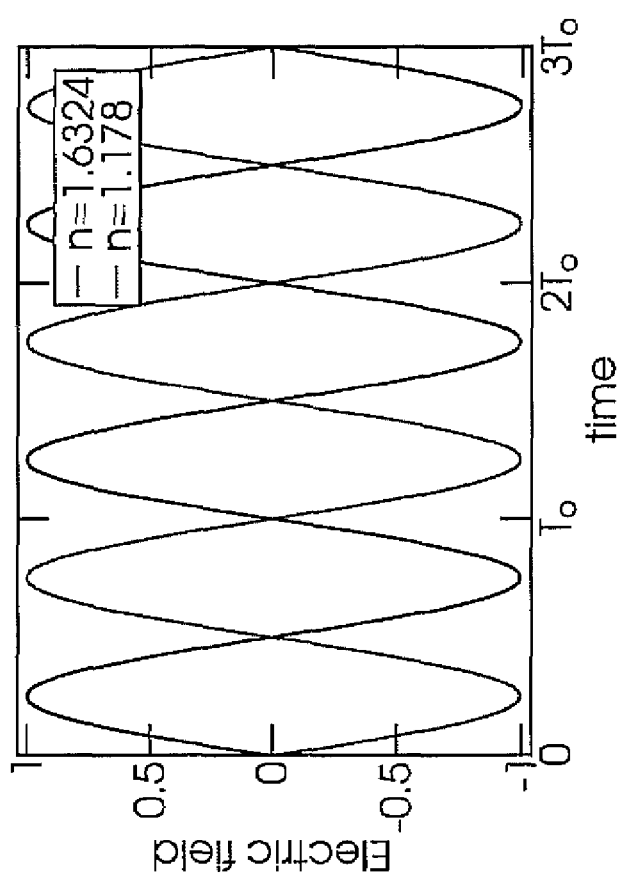
FIG. 3 is a graph demonstrating the electric fields as a function of time at a point opposite the source for two values of the index of the nonlinear material in the microcavities, $n_c=1.178$ and $n_c=1.6324$.

Using a high and low dielectric of indices $n_1$=2.4 and $n_2$=1.6 and period a with 2.5 exterior bilayers and only a single interior layer yields two resonant peaks within the bandgap at normal incidence, centered around $\omega$=0.25($2\pi c/a$), with a quality factor Q≈40, which corresponds to a bandwidth of approximately 2.5% of the central frequency. Choosing the microcavities to have equal thicknesses of 1.5a and indices of $n_c$=1.178 and $n_c$=1.6324 yields the result shown in FIG. 2: two different resonances peaking at the same frequency, also displaying very similar bandwidths. According to equation (1), the peaks of the two resonances should differ in phase by $\pi$. This prediction is checked in FIG. 3, which shows that the fields as a function of time for the two microcavity index values are almost exactly $\pi$ out of phase with one another.

By comparison, the phase change associated with a layer of nonlinear material with thickness 1.5a and equal index change is only 0.341$\pi$, about a third of the phase change seen for this device.

The invention can be applied both in the optical and microwave regime. The material used will be determined by whether the optical or microwave regime is of interest. In the optical regime, the high index layers can be silicon or silicon nitride, the low index layers can be silica, and the nonlinear material can be tellurium, gallium arsenide or aluminum oxide. In the microwave regime, the high index layers can be aluminum oxide or silicon nitride, low index layers can be quartz or Teflon®, and the nonlinear material can be lithium niobate.

Note that the parameters used in this discussion are just an example, and one can use this design with any frequency where dielectric media can be treated macroscopically, ranging from radio frequencies to ultraviolet light. The range of materials that can be used in this design is almost unlimited and only restricted by practical considerations such as device size and loss tolerance. Furthermore, any bandwidth that is not extremely broad, for example less than 10% of the midrange frequency, could conceivably be used in this device with proper choice of dielectric materials. There is, however, a tradeoff between bandwidth and index shift: the smaller the bandwidth needed, the lower the index shift needed, and vice-versa. As a consequence, one can achieve a $\pi$ phase shift for monochromatic light with an arbitrarily small index shift given a sufficiently high quality factor cavity.

Alternatively, one can forgo the maximum bandwidth in order to maximize transmission. When the bandwidth of the signal is comparable to that of the full width at half maximum for the cavity modes used, transmission should be substantial but not 100%. However, reflection losses can be decreased to arbitrarily low amounts by decreasing the ratio of the signal bandwidth to the utilized cavity mode FHWM.

Although the present invention has been shown and described with respect to several preferred embodiments thereof, various changes, omissions and additions to the form and detail thereof, may be made therein, without departing from the spirit and scope of the invention.

What is claimed is:

1. A phase shifter comprising:
   at least two photonic crystal structures having alternating high and low index dielectric layers; and
   at least two defect structures, each of said at least two defect structure being positioned between said at least two photonic crystal structures, each of said at least two defect structures comprises material layers that include a multi-layered arrangement having a one or more electrodes, an insulator layer, and one or more nonlinear materials used to produce an index change that is amplified to produce a specified phase shift in the output signal of said phase shifter, wherein one or more electrodes are arranged as to apply a significant controllable electric field to said one or more nonlinear materials, said at least two photonic crystals structures being separated by a distance equal to the width of the at least two defect structures.

2. The phase shifter of claim 1, wherein said high index layer used in the optical regime comprises Si.

3. The phase shifter of claim 1, wherein said low index layer used in the optical regime comprises $SiO_2$.

4. The phase shifter of claim 1, wherein said nonlinear material used in the optical region comprises GaAs.

5. The phase shifter of claim 1, wherein said nonlinear material used in the optical region comprises aluminum oxide.

6. The phase shifter of claim 1, wherein said high index layer used in the microwave regime comprises aluminum oxide.

7. The phase shifter of claim 1, wherein said low index layer used in the microwave regime comprises Teflon®.

8. The phase shifter of claim 1, wherein said nonlinear material used in the microwave region comprises lithium niobate.

9. The phase shifter of claim 1, wherein said defect structure comprises a transparent electrode and an insulator layer.

10. The phase shifter of claim 1, wherein said at least one photonic crystal structure comprises a 1D photonic crystal structure.

11. The phase shifter of claim 1, wherein said at least one photonic crystal structure comprises a high index photonic crystal slab in 2D.

12. The phase shifter of claim 1, wherein said at least one photonic crystal structure comprises a complete photonic bandgap material in 3D.

13. A method of forming a phase shifter comprising:
   forming at least two photonic crystal structures having alternating high and low index dielectric layers; and
   forming at least two defect structures, wherein each of said at least two defect structure are positioned between said at least two photonic crystal structures, each of said at least two defect structures comprises material layers that include a multi-layered arrangement having a one or more electrodes, an insulator layer, and one or more nonlinear materials used to produce an index change that is amplified to produce a specified phase shift in the output signal of said phase shifter, wherein one or more electrodes are arranged as to apply a significant controllable electric field to said one or more nonlinear materials, said at least two photonic crystals structures being separated by a distance equal to the width of the at least two defect structures.

14. The method of claim 13 wherein said high index layer used in the optical regime comprises Si.

15. The method of claim 13, wherein said low index layer used in the optical regime comprises $SiO_2$.

16. The phase shifter of claim 11, wherein said nonlinear material used in the optical region comprises GaAs.

17. The method of claim 13, wherein said nonlinear material used in the optical region comprises aluminum oxide.

18. The method of claim 13, wherein said high index layer used in the microwave regime comprises aluminum oxide.

19. The method of claim 13, wherein said low index layer used in the microwave regime comprises Teflon®.

20. The method of claim 13, wherein said nonlinear material used in the microwave region comprises lithium niobate.

21. The method of claim 13, wherein said defect structure comprises a transparent electrode and an insulator layer.

22. The method of claim 13, wherein said at least one photonic crystal structure comprises a 1D photonic crystal structure.

23. The method of claim 13, wherein said at least one photonic crystal structure comprises a high index photonic crystal slab in 2D.

24. The method of claim 13, wherein said at least one photonic crystal structure comprises a complete photonic bandgap material in 3D.

* * * * *